United States Patent
Wang

(10) Patent No.: US 8,442,594 B2
(45) Date of Patent: May 14, 2013

(54) COMMUNICATION DEVICE AND METHOD FOR PROCESSING INCOMING CALLS

(75) Inventor: Peng Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 16 days.

(21) Appl. No.: 13/163,698

(22) Filed: Jun. 19, 2011

(65) Prior Publication Data

US 2012/0184256 A1 Jul. 19, 2012

(30) Foreign Application Priority Data

Jan. 14, 2011 (CN) .......................... 2011 1 0008151

(51) Int. Cl.
*H04M 1/00* (2006.01)

(52) U.S. Cl.
USPC ... 455/567; 455/412.2; 455/417; 379/106.05; 379/106.09; 379/421; 379/911

(58) Field of Classification Search .................... 379/82, 379/106.05, 106.09, 207.08, 207.09, 207.16, 379/378.02, 421, 911; 455/415, 417
See application file for complete search history.

(56) References Cited

U.S. PATENT DOCUMENTS

2004/0266490 A1 * 12/2004 Silver ........................... 455/567
2006/0212561 A1 * 9/2006 Feng ............................. 709/223

* cited by examiner

*Primary Examiner* — Vladimir Magloire
(74) *Attorney, Agent, or Firm* — Altis Law Group, Inc.

(57) ABSTRACT

A communication device includes a receiving unit, a number obtaining unit, and a reminder unit. The incoming receiving unit receives an incoming call request from a caller. The number obtaining unit obtains a phone number of the caller from the incoming call request. The reminder unit includes a reminder state, and a non-reminder state which is default. The reminder unit generates a prompt to remind a callee to accept the incoming call when in the reminder state, and does not generate a prompt for the incoming call when in the non-reminder state. The reminder unit changes into the reminder state from the non-reminder state when the phone number of the caller is not listed in a phonebook of the communication device and request duration of the incoming call reaches a predetermined value.

13 Claims, 2 Drawing Sheets

COMMUNICATION DEVICE AND METHOD FOR PROCESSING INCOMING CALLS

BACKGROUND

1. Technical Field

The present disclosure relates to communication devices; and particularly to a method for processing an incoming call used by a communication device.

2. Description of Related Art

Cell phones have become a popular communication tool. However, the users may feel troubled because their phones often receive disturbance calls from strangers who mistakenly dial, or from toll phone numbers having a pre-recorded message resulting in the calling numbers being charged a toll or a fee for making the call.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
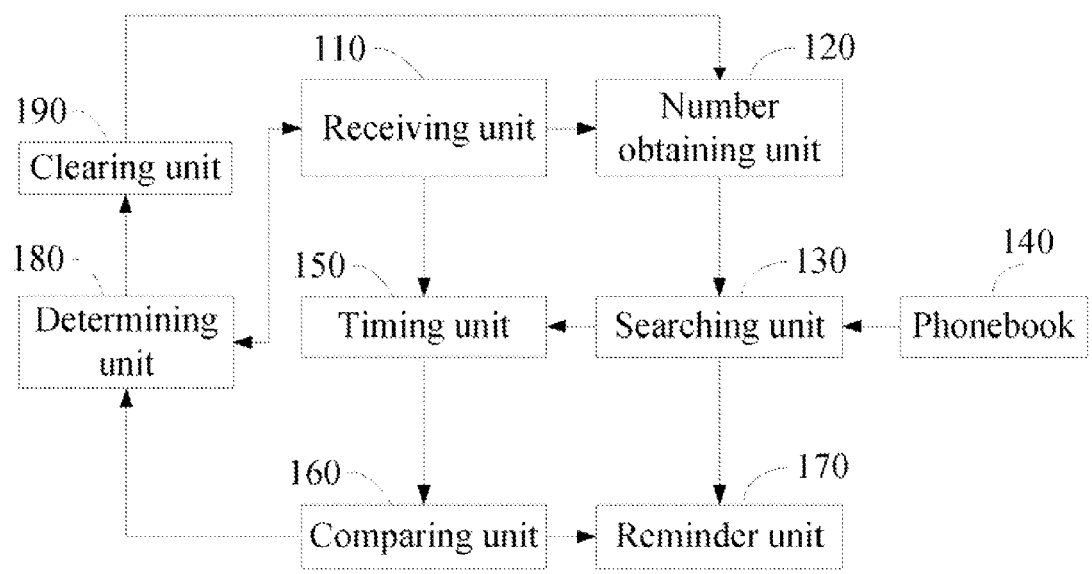
FIG. 1 is a block diagram of the communication device in accordance with one embodiment.

Referring to FIG. 1, a communication device 99 includes a receiving unit 110, a number obtaining unit 120, a searching unit 130, a phonebook 140 containing a list of telephone subscribers and their telephone numbers, a timing unit 150, a comparing unit 160, a reminder unit 170, a determining unit 180, and a clearing unit 190. The communication device 99 may be a cell phone, or a personal digital assistant (PDA) with communication functions.

The receiving unit 110 is used for receiving an incoming call request from a caller, and generating a call signal when the communication device 99 is called. The incoming call request at least includes a phone number of the caller.

The number obtaining unit 120 is used for obtaining the phone number of the caller from the incoming call request, and generating a searching signal in response to the call signal.

The searching unit 130 is used for determining whether the phone number of the caller is listed in the phonebook 140 in response to the searching signal. When it is determined that the phone number of the caller is listed in the phonebook 140, the searching unit 130 generates a reminder signal. When it is determined that the phone number of the caller is not listed in the phonebook 140, the searching unit 130 generates a timing signal.

The timing unit 150 is used for computing a request duration of the incoming call from the caller in response to the timing signal.

The comparing unit 160 is used for determining whether the request duration reaches a predetermined value. When it is determined that the request duration reaches the predetermined value, the comparing unit 160 generates a reminder signal. When it is determined that the request duration does not reach the predetermined value, the comparing unit 160 generates a determining signal. The predetermined value can be determined according to the requirements of the user. In the embodiment, the predetermined value is 10 seconds.

The reminder unit 170 includes a reminder state, and a non-reminder state which is default. The reminder unit 170 generates a prompt to remind a callee who is using the communication device 99 to accept the incoming call when in the reminder state, and does not generate a prompt for the incoming call when in a non-reminder state. The prompt generated by the reminder unit 170 may be in a ringtone mode, a vibration mode, or in combination. The reminder unit 170 is used for changing into the reminder state from the non-reminder state in response to the reminder signal, thus generating the prompt to remind the callee to accept the incoming call from the caller whose phone number is listed in the phonebook 140 or which request duration reaches the predetermined value. Because the incoming calls, from the caller whose phone number is listed in the phonebook 140 or which request duration is longer than the predetermined value, are often not disturbance calls, such incoming calls will not trouble the callee.

The determining unit 180 is used for determining whether the incoming call request from the caller is stopped in response to the determining signal, and generating a clear signal when it is determined that the incoming call request from the caller is stopped.

The clearing unit 190 is used for clearing the obtained phone number of the caller in response to the clear signal. The incoming call, which request duration is shorter than the predetermined value, are often from strangers who mistakenly dial or from toll phone numbers having a pre-recorded message resulting in the called numbers being charged a toll or a fee for making the call. The reminder unit 170 does not generate a prompt for such incoming call, and clears the phone number of such incoming call, thus the inconveniences caused by the communication device 99 are decreased.

Figure 2:
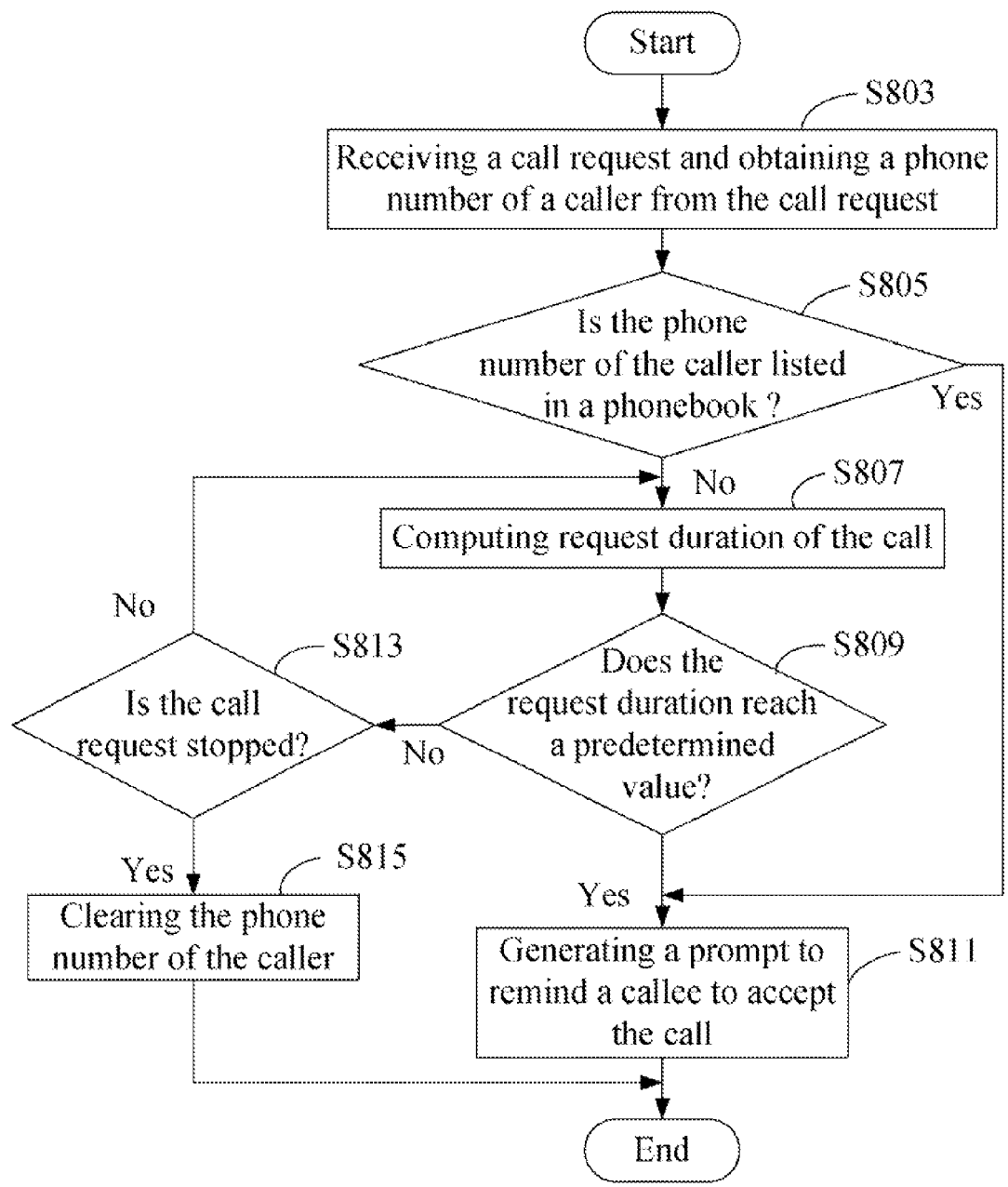
FIG. 2 is a flow chart of a method for processing an incoming call in accordance with one embodiment.

Referring to FIG. 2, a method for processing an incoming call is used by a communication device. The communication device executes the program codes to implement the method when being called. The communication device includes a reminder state, and a non-reminder state which is default. The communication device generates a prompt to remind a callee who is using the communication device to accept the incoming call when in the reminder state, and does not generate a prompt for the incoming call when in the non-reminder state. The prompt generated by the communication device may be in a ringtone mode, a vibration mode, or in combination. The method for processing the incoming call includes the following steps.

In step S803, receiving an incoming call request from a caller, and obtaining the phone number of the caller from the incoming call request.

In step S805, determining whether the phone number of the caller is listed in a phonebook of the communication device. If it is determined that the phone number of the caller is listed in the phonebook, step S811 is implemented. If it is determined that the phone number of the caller is not listed in the phonebook, step S807 is implemented.

In step S807, computing a request duration of the incoming call from the caller.

In step S809, determining whether the request duration reaches a predetermined value. If it is determined that the request duration reaches the predetermined value, step S811 is implemented. If it is determined that the request duration does not reach the predetermined value, step S813 is implemented. The predetermined value can be determined according to the requirements of the user. In the embodiment, the predetermined value is 10 seconds.

In step S811, the communication device changes into the reminder state from the non-reminder state, thus generating the prompt to remind the callee to accept the incoming call from the caller whose phone number is listed in the phonebook of the communication device or which request duration reaches the predetermined value. Because the incoming call, from the caller whose phone number is listed in the phonebook of the communication device or which request duration is longer than the predetermined value, are often not disturbance calls, such incoming calls will not trouble the callee.

In step S813, determining whether the incoming call request from the caller is stopped. If it is determined that the incoming call request from the caller is stopped, step S815 is implemented. If it is determined that the incoming call request from the caller is not stopped, step S807 is repeated.

In step S815, clearing the obtained phone number of the caller. The incoming call, which request duration is shorter than the predetermined value, are often from strangers who mistakenly dial or from toll phone numbers having a pre-recorded message resulting in the called numbers being charged a toll or a fee for making the call. The communication device does not generate a prompt for such incoming call, and clears the phone number of such incoming call, thus the inconveniences caused by the communication device are decreased.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A communication device, comprising:
    a receiving unit for receiving an incoming call request from a caller, and generating a call signal when the communication device is called;
    a number obtaining unit for obtaining the phone number of the caller from the incoming call request, and generating a searching signal in response to the call signal;
    a searching unit for determining whether the phone number of the caller is listed in a phonebook of the communication device in response to the searching signal, and generating a timing signal when it is determined that the phone number of the caller is not listed in the phonebook;
    a timing unit for computing a request duration of the incoming call from the caller in response to the timing signal;
    a comparing unit for determining whether the request duration reaches a predetermined value, and generating a reminder signal when it is determined that the request duration reaches the predetermined value, the comparing unit further used for generating a determining signal when it is determined that the request duration does not reach the predetermined value;
    a reminder unit comprising a reminder state, and a non-reminder state which is default, the reminder unit generating a prompt to remind a callee to accept the incoming call when in the reminder state, and not generating a prompt for the incoming call when in the non-reminder state; the reminder unit being used for changing into the reminder state from the non-reminder state in response to the reminder signal;
    a determining unit for determining whether the incoming call request from the caller is stopped in response to the determining signal and generating a clear signal when it is determined that the incoming call request from the caller is stopped; and
    a clearing unit for clearing the obtained phone number of the caller in response to the clear signal.

2. The communication device according to claim 1, wherein the searching unit is further used for generating a reminder signal when it is determined that the phone number of the caller is listed in the phonebook.

3. The communication device according to claim 1, wherein the prompt generated by the reminder unit is in a ringtone mode, a vibration mode, or in combination.

4. The communication device according to claim 1, wherein the predetermined value is 10 seconds.

5. A method for processing an incoming call, used by a communication device, the communication device comprising a reminder state, and a non-reminder state which is default; the communication device generating a prompt to remind a callee to accept the incoming call when in the reminder state, and not generating a prompt for the incoming call when in the non-reminder state; the method comprising:
    receiving an incoming call request from a caller, and obtaining the phone number of the caller from the incoming call request;
    determining whether the phone number of the caller is listed in a phonebook of the communication device;
    when it is determined that the phone number of the caller is not listed in the phonebook, computing a request duration of the incoming call from the caller;
    determining whether the request duration reaches a predetermined value;
    when it is determined that the request duration does not reach the predetermined value, determining whether the incoming call request from the caller is stopped;
    when it is determined that the incoming call request from the caller is stopped, clearing the obtained phone number of the caller; and
    when it is determined that the request duration reaches the predetermined value, the communication device changing into the reminder state from the non-reminder state.

6. The method according to claim 5, further comprising:
    when it is determined that the phone number of the caller is listed in the phonebook, the communication device changing into the reminder state from the non-reminder state.

7. The method according to claim 5, further comprising:
    when it is determined that the incoming call request from the caller is not stopped, the step of computing the request duration of the incoming call request from the caller is further implemented.

8. The method according to claim 5, wherein the prompt generated by the reminder unit is in a ringtone mode, a vibration mode, or in combination.

9. The method according to claim 5, wherein the predetermined value is 10 seconds.

10. A communication device, comprising:
- a receiving unit for receiving an incoming call request from a caller;
- a number obtaining unit for obtaining the phone number of the caller from the incoming call request; and
- a reminder unit comprising a reminder state, and a non-reminder state which is default, the reminder unit generating a prompt to remind a callee to accept the incoming call when in the reminder state, and not generating a prompt for the incoming call when in the non-reminder state; the reminder unit being used for changing into the reminder state from the non-reminder state when the phone number of the caller is not listed in a phonebook of the communication device and request duration of the incoming call reaches a predetermined value; the obtained phone number of the caller is cleared when the phone number of the caller is not listed in a phonebook of the communication device and the request duration the incoming call does not reach the predetermined value.

11. The communication device according to claim 10, wherein the reminder unit is further used for changing into the reminder state from the non-reminder state when the phone number of the caller is listed in the phonebook of the communication device.

12. The communication device according to claim 10, wherein the prompt generated by the reminder unit is in a ringtone mode, a vibration mode, or in combination.

13. The communication device according to claim 10, wherein the predetermined value is 10 seconds.

* * * * *